H. D. ROHMAN.
CAR LIGHTING SYSTEM.
APPLICATION FILED OCT. 1, 1918.
1,365,544.
Patented Jan. 11, 1921.
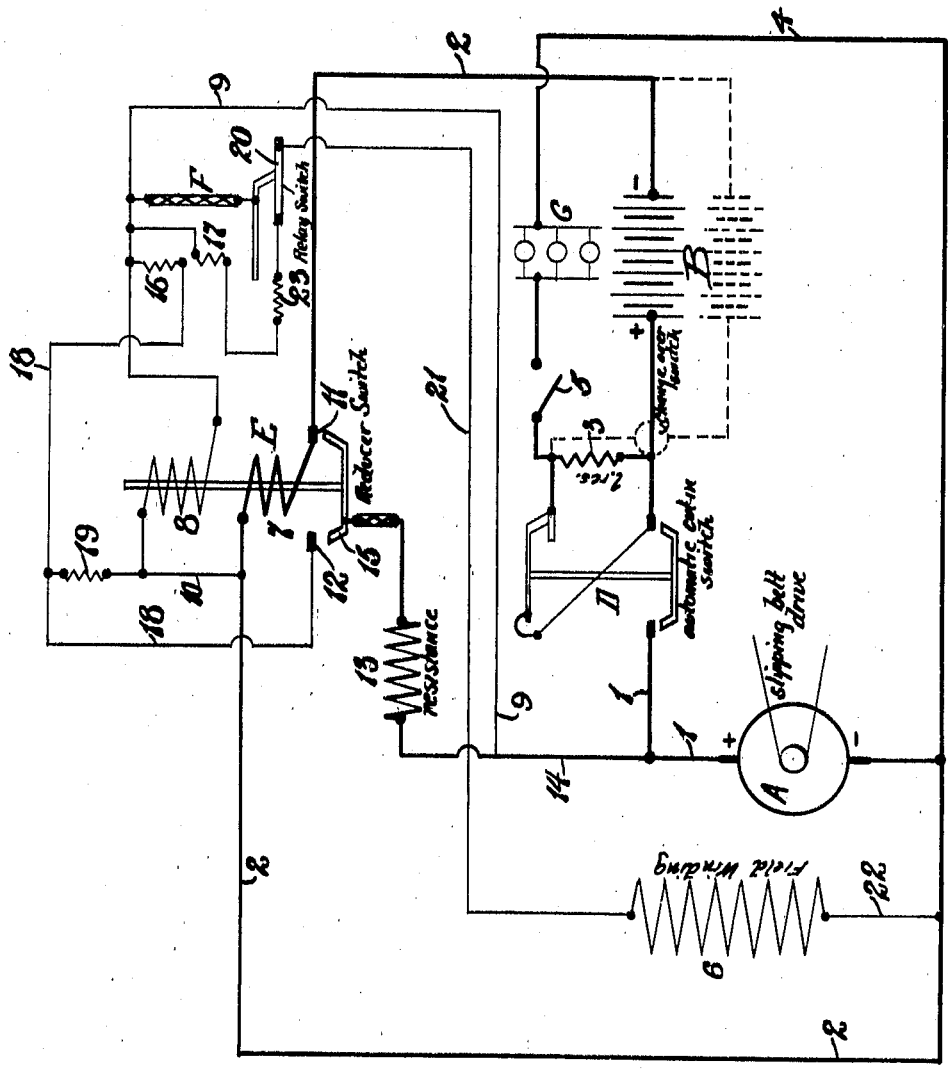
WITNESS
George Symnestvedt
INVENTOR
Harry D Rohman
by
Symnestvedt Lechner
ATTOR

UNITED STATES PATENT OFFICE.

HARRY D. ROHMAN, OF NEW YORK, N. Y.

CAR-LIGHTING SYSTEM.

1,365,544.     Specification of Letters Patent.     Patented Jan. 11, 1921.

Application filed October 1, 1918. Serial No. 256,380.

*To all whom it may concern:*

Be it known that I, HARRY D. ROHMAN, a citizen of the Republic of Switzerland, and residing at New York city, in the county of New York and State of New York, United States of America, have invented certain new and useful Improvements in Car-Lighting Systems, of which the following is a specification.

This invention relates to improvements in electric lighting and heating systems such as are used, for example, for railway and other vehicles, and it has for one of its primary objects the provision of a simple but effective arrangement for correctly and quickly charging secondary batteries such as are generally used in car lighting systems. Another of the primary objects of the invention has to do with an effective arrangement for reducing the battery charging current in accordance with the condition or state of charge of the battery or batteries and so prevent heating and injurious charging.

Still another important object of the invention is the provision of means to stop the charge entirely when certain basic conditions of the battery or batteries indicate that the charge has been completed.

My invention also contemplates the provision of means for automatically safeguarding the generator on both open circuit and on overload as when the belt is made too tight for the required capacity, normal conditions being restored each time the train starts up again.

Yet another object of the invention is the provision of means whereby the generator carries the lamp load and supplies proper lamp voltage although the battery circuit may be interrupted and the lamp load is solely across the generator.

Finally, my invention contemplates the provision of an improved system by means of which I am enabled to avoid the use of the complicated carbon pile and other rheostatic regulating mechanism of one standard type of train lighting equipment, and the ampere hour meter control mechanism of another well-known type of train lighting system.

The foregoing, together with such other objects as may hereinafter appear or are incident to my invention, I have obtained by means of a construction and arrangement, the preferred embodiment of which I have shown in the accompanying drawings in diagrammatic form.

Generally speaking, a train lighting system must be designed along the lines of the characteristic of the battery in conjunction with which the car lighting equipment is to operate.

Referring to the drawing, the reference letter A indicates a dynamo which is preferably of the speed controlled or constant torque type such, for example, as the slipping belt drive type of dynamo, in which, when the train reaches the critical speed at which the dynamo delivers the full output, say, for example, 20 miles per hour, the belt begins to slip on the dynamo pulley and the armature thereafter rotates at the same rate of speed regardless of variations in the external resistance as will be described hereinafter. This type of generator control produces constant wattage output, the voltage rising as the amperage drops off, and vice versa. Ordinarily the charging of a discharged train lighting battery may be begun with a current of 30 amperes at a pressure of 30 volts, or 900 watts, and as the battery nears completion of charge, the charging voltage may rise to approximately 42 volts, and the current will automatically be reduced to approximately 21.4 amperes. This constant watt control machine, therefore, in itself forms a measure of protection for the battery in that it secures an automatically tapering charge within certain limits, but for varied train service of the character hereinbefore described, it would not be sufficient for an efficient car lighting system. To meet these conditions, and to obtain the advantages and objects herein pointed out, I provide an arrangement now to be described.

The battery B, which may be of the single or double unit type is supplied by the dynamo A through the positive lead 1, the circuit being completed through the negative or return lead 2. The lamp or other translating circuits C (of which only one is shown), are also supplied from the positive lead through the lamp iron wire resistance 3, the circuit being completed by the return lead 4 connected to the negative main. The lamp circuit is controlled by the switch 5. The field winding is indicated diagrammatically at 6, and the system is provided with the usual automatic cut-in switch D which is adapted to be closed when the dynamo voltage becomes equal to or greater than the battery voltage and to be opened when the dynamo voltage drops below that of the battery, in a well-known manner.

The generator is normally set for an output which will assure a quick battery charge, and such charge is adapted to be reduced by means of what I have termed the reducer switch E. This relay or reducer switch is provided with a series operating coil 7 located in the main return 2, and it is also provided with a shunt coil 8 which is connected across the generator by means of the wires 9 and 10. This shunt coil is so calibrated that at a predetermined voltage, say for example, 45 volts, it will attract the reducer switch to closed position closing the circuit between the terminals 11 and 12, and this regardless of whether or not there is any current passing through the series coil 7. When the reducer switch has been thus attracted to closed position, the resistance 13 is placed across the dynamo, in parallel with the battery B, the flow of current being as follows:—from lead 1 to wire 14, resistance 13, brush 15 of the reducer switch, terminal 11, series coil 7, and negative return 2 to the dynamo. By this arrangement the generator is safeguarded against open circuit running in that at a predtermined voltage the reducer switch automatically places a load across the generator even though the battery may be disconnected.

Furthermore, the reducer switch and the resistance 13 supplement the protection afforded to the battery by the dynamo, in the manner above set forth, and protect the battery against overheating occasioned through charge rates which are above normal for any particular state of charge of battery. The correct charge rate for the "lead-acid" battery most commonly used for car lighting systems varies in accordance with the state of charge of the battery, and the state of charge of the battery will be reflected by the joint action of the series coil 7 and the shunt coil 8, which operate the reducer switch to insert the resistance 13 in parallel with the batteries, thus providing a parallel path for a predetermined amount of generator current which automatically reduces the battery current to a predetermined value. By properly calibrating the two coils, the critical condition at which the charge must be reduced will always be correctly met by the joint efforts of the two coils, and in this connection I so proportion the series turns that it will be impossible to force a harmful charge rate through the battery, although a good sound charge into the battery may take place, provided the battery requires such a charge, which would be indicated by the charging voltage. The shunt coil 8 is so calibrated that it will permit such a heavy charge rate to pass through the battery and through the series coil 7 on its path back to the generator, when the charging voltage is low, as it would be, for example, when the battery, or batteries, is, or are, depleted.

It will be seen, therefore, from the foregoing that the charging rate is first varied through the method of control used on the generator which results in constant watt output and secondly, through the reducer switch which inserts the resistance 13 in parallel and thereby materially reduces the charge rate. After the reducer switch is operated, the charging proceeds until, with the reduced charge rate, the voltage of the battery rises to a new predetermined value, when additional apparatus, now to be described, will operate to cause the battery to be entirely disconnected from the generator.

This additional apparatus comprises a relay F provided with two operating coils 16 and 17. The coil 16 is connected to wire 9, which is connected to wire 14, which, in turn, is connected to the positive lead 1. The coil 16 is also connected to the terminal 12 by means of wire 18, and it is also connected to wire 10 through resistance 19. The coil 16 is thus always connected across the mains through the resistance 19, and when the reducer switch E has been attracted to closed position and the brush 15 thereof makes contact with contacts 11 and 12, it will be seen that resistance 19 is short-circuited and the negative end of coil 16 will be connected to the negative main 2 through no resistance except that which is offered by the low resistance coil 7 which for this purpose is negligible.

It will be seen, from inspection of the drawing, that the field winding 6 is connected to the positive main 1 through wire 14, wire 9, relay switch F, contact 20 and wire 21, and to the negative main 2 by the wire 22. The operating coil 17 is also connected to wire 9 and to contact 20 through a resistance 23.

The resistance 19 preferably has a value of about 120 ohms and normally, therefore, the coil 16 will not be sufficiently energized to attract the relay switch F to open position. When, however, the reducer switch E has been closed to reduce the rate of charge, the resistance 19 will be short circuited, as before noted, and the operating coil 16 will be placed in condition to operate, at the voltage for which it is calibrated. The construction of the reducer switch is such as to make contact at 11 before making it at 12, as with a heavy charge the voltage might be above the final value at which the charge is to be disconnected.

I prefer to calibrate the coil 16 to operate at a voltage of say 40 which would indicate a state of full charge under conditions obtaining after the reducer switch has operated. When this voltage is reached, at the reduced rate of charge, the coil 16 will attract the relay switch F to open position breaking the normal field circuit and inserting the resistance 23 in such circuit. The resistance 23 is preferably so calibrated as to practically wipe out the field strength. The generator is thus practically killed off and as a result will not generate a voltage sufficient to maintain the automatic cut-in switch D in closed position and the battery will be disconnected from the dynamo. As a practical matter, I prefer to so calibrate the resistance 23 that at a train speed of 100 miles per hour the generator voltage will be negligible, say for example, less than 10 volts.

After the coil 16 has operated to attract the relay switch F and break the normal field circuit, the coil 17 becomes effective and assists coil 16 in holding up the relay switch. The advantage of this arrangement is that the dynamo is protected, for normal conditions can only be restored when the train practically comes to a stop. If sole reliance were placed upon the coil 16 for holding up the relay switch F, it will be apparent, for example, that what is technically termed "hunting" might take place. The supplemental coil 17 overcomes this difficulty because the generator, even though the resistance 23 has been inserted in the field, will still be able to develop sufficient voltage to cause the coil 17 to hold the relay switch in open position.

Assuming that the battery has become fully charged, and the parts have operated in the manner described, and that the train has made a stop, and the switch F closed and reëstablished normal field conditions, when the train starts again the generator will build up its voltage until the cut-in switch D operates to connect the battery to the generator. At this time if the battery still remains in a fully charged condition, the reducer switch will immediately close on slight charge, short circuiting the resistance 19, whereupon the coil 16 will operate to open the switch F, as before described. If, however, the battery is partially discharged but the state of charge is still above that at which the reducer switch will operate to close and insert the resistance 13, immediately after the closing of the cut-in switch, the reducer switch would close, as just set forth, and charging would continue at the reduced rate until the battery voltage reached 40, when the coil 16 would again operate. If, however, the battery be fairly well depleted, when the cut-in switch closes, the reducer switch would not close and charging would continue and the operation hereinbefore described would take place. The battery conditions are thus subjected to repeated test, and the mechanism will only perform the cycle of operations described if full charge conditions obtain.

As before noted, the coil 16 is normally connected across the mains through the resistance 19, and therefore, the coil 16 may operate to open the relay F before the reducer switch closes provided the generator voltage rises above a predetermined value, say for example, 47 volts. In this connection, the resistance 19 is so calibrated that at this voltage, the coil 16 will be sufficiently energized to attract the relay switch F. In this manner the generator is further protected against open circuit running, and all shunt coils, resistances and lamps are protected against excessive voltage.

It will be seen from the foregoing that both before and after the reducer switch is operated, the system is a constant watt system and has all of the advantages of such a system in so far as the charging of the battery, or batteries, is concerned. At the same time, however, the batteries are protected against overheating and overcharging, and the system, therefore, has all of the advantages of the carbon pile regulating systems, without the objectionable features of such systems, and is an improvement upon the plain ampere hour meter control systems, without their disadvantages. The system is particularly applicable with batteries of the "lead-acid" type, and where the battery capacity is made up of 2 units alternately charged, it can be readily seen that such apparatus, as heretofore described, will always insure that the low or discharged unit receives an ample charge, while the fully charged unit, provided the two units have gotten out of step with each other in regard to state of charge, will never receive an overcharge. The system also has other advantages over the constant current and constant voltage types, in which complicated regulating mechanism must be employed, as for example, it is far more flexible and adapts itself to widely varying intermittent service conditions. Furthermore, owing to great reduction of and simplicity in parts, the improved system is far more reliable and serviceable.

In the embodiment of my invention shown and described, I prefer to place a load across the generator to reduce the rate of charge to the battery. It is, of course, to be understood that with the generator which I prefer to use for this invention, the charge rate can be reduced in any number of different ways.

Another advantage of my improved system is that it will at once be seen that I am enabled to use a car equipped with this system in varying kinds of service, without change. This follows from the fact that I charge the battery at a heavy predetermined rate and then reduce the charge value say about one-half, or any predetermined value that the engineer may select, the charge continuing at the reduced rate until the battery is fully charged, as indicated by the battery voltage, after which the generator is entirely disconnected so as to prevent overcharge. With such equipment the car can be intermittently used on short runs with many stops, in which class of service it is obvious that the battery must be charged at a high rate in order to maintain a state of charge, or used on long runs with infrequent stops, in which case, the batteries, although quickly charged, will nevertheless be fully protected. Furthermore, it will be noted that with my improved system, the lamp current will always be maintained at proper pressure. By way of illustration, the preferable lamp voltage is 32, and the iron wire lamp resistance will absorb from 8 to 16 volts, so that at 40 generator volts, the lamp voltage is 32; and if the generator voltage rises to 45, the lamp voltage will still be approximately 32, but at this condition, the reducer switch will operate because of coil 8 and place a load across the generator, which rectifies the external resistance so that the dynamo may perform its qualitative regulations of the output through slipping of the belt.

By way of specific illustration, I prefer to use a slipping belt generator set for one kilowatt output. The design of the reducer switch is such that when the combined efforts of the series and shunt coils produce 600 ampere turns, the plunger of the switch will be attracted and a reduction of charging current will take place. With such apparatus the charge rate will be cut down to any predetermined value at a point somewhere between 35 and 40 volts. Charging would continue under these conditions until the battery reaches a predetermined voltage, it being kept in mind, however, that the reduced charge rate continually reduces or tapers off as the battery rises in voltage, for the reasons before pointed out. When the predetermined volts per cell with the reduced charge rate is reached, the batteries will be disconnected.

It will, of course, be understood that speed controlled generators, other than the slipping belt type, above described, can be employed and that various other modifications of the invention can be made without departing from the spirit thereof.

I claim:

1. In a car lighting system the combination of a dynamo, a battery to be charged, an electromagnetic switch for reducing the rate of charge, and an electromagnetic charge modifying relay normally ineffective but adapted to be rendered effective by the electromagnetic charge reducing means.

2. In a car lighting system the combination of a constant watt dynamo, a battery to be charged, electromagnetic means for reducing the rate of charge, and electromagnetic stop charge means normally ineffective but adapted to be rendered effective by the electromagnetic charge reducing means.

3. In a car lighting system the combination of a constant watt dynamo, a battery to be charged, a voltage operated stop charge relay, a resistance element through which said relay is connected across the generator, and electromagnetic charge reducing means for short circuiting said resistance.

4. In a car lighting system the combination of a dynamo, a battery to be charged, an electromagnetic switch for reducing the rate of charge, and an electromagnetic charge modifying relay normally ineffective but adapted to be placed in condition to become effective upon actuation of the electromagnetic charge reducing switch.

5. In a car lighting system the combination of a dynamo, a battery to be charged, an electromagnetic switch for reducing the rate of charge, an electromagnetic charge modifying relay, and means normally rendering said charge modifying relay ineffective, said relay being rendered effective upon actuation of the electromagnetic charge reducing switch.

6. In a car lighting system the combination of a dynamo, a battery to be charged, an electromagnetic switch for reducing the rate of charge, an electromagnetic stop charge means, and a resistance element for rendering said stop charge means ineffective, said resistance being short circuited by the charge reducing switch.

7. In a car lighting system the combination of a dynamo, a battery to be charged, an electromagnetic reducer switch, a charge modifying relay and means normally rendering the modifying relay ineffective, said means being rendered ineffective for such purpose when the reducer switch closes and said means being connected across the generator at all times whereby the generator is protected against open circuit running.

8. In a car lighting system, the combination of a constant watt dynamo, a battery to be charged, means for reducing the rate of charge, said means being normally ineffective, electro-magnetic means for rendering such charge reducing means effective, a resistance adapted to be placed in the circuit of the field winding of the dynamo but normally short-circuited, and means for placing such resistance in the field circuit, said means being normally ineffective, but being rendered effective by the means for rendering the charge reducing means effective.

9. In a car lighting system, the combination of a constant watt dynamo, a battery to be charged, electro-magnetically controlled means for reducing the rate of charge, a voltage operated stop charge relay normally connected through a resistance across the battery mains, said resistance being short-circuited upon the operation of the electro-magnetically controlled charge reducing means.

In testimony whereof, I have hereunto signed my name.

H. D. ROHMAN.